United States Patent Office 3,704,114
Patented Nov. 28, 1972

---

3,704,114
PROCESS AND FURNACE CHARGE FOR USE IN THE PRODUCTION OF FERROSILICON ALLOYS
Benjamin John Wilson, Youngstown, N.Y., Richard J. McClincy, Tucson, Ariz., and James Herbert Downing, Clarence, N.Y., assignors to Union Carbide Corporation, New York, N.Y.
No Drawing. Filed Mar. 17, 1971, Ser. No. 125,435
Int. Cl. C22c 39/44
U.S. Cl. 75—3                                                8 Claims

ABSTRACT OF THE DISCLOSURE

An agglomerated furnace charge, and process thereof, for use in the electric furnace production of ferrosilicon alloys having 45% to 95% silicon by weight. The charge comprises a fine fraction and a coarse fraction of silica homogeneously admixed with a particulated iron-bearing material, a particulated carbonaceous reducing agent and a bulking agent.

FIELD OF THE INVENTION

This invention relates to a process for, and the furnace charge used in an eelctric furnace production of ferrosilicon containing between 45% and 95% by weight silicon. Specifically, the furnace charge for use in this invention consists of a substantially homogeneous agglomerate comprising an iron-bearing material, a fine fraction and a coarse fraction of particulated silica, a carbonaceous reducing agent, and a bulking agent with or without a binder.

DESCRIPTION OF THE PRIOR ART

Ferrosilicon is produced by charging metallic iron, silica and a carbonaceous reducing agent into a submerged arc electric furnace whereupon the heat generated from the submerged arc is sufficient to effect reduction of the reducible additives to yield an iron-silicon alloy. Various agglomerate furnace charges comprising finely divided silica admixed with iron-bearing metallic material and a carbon reductant have been employed. The exact carbon content stoichiometrically required for the reduction of all the silica present in the charge has been varied somewhat depending on the percentage of silicon desired in the final alloy.

Despite the many approaches available for preparing ferrosilicon charges, i.e., blending all the alloy additives in appropriate proportions into an agglomerate charge, maintaining the additives in a loose mix state, or the blending of the additives except silica so that the latter can be charged to the furnace separately from the agglomerate, the overall production of iron-silicon alloys, particular high silicon content alloys, is characterized by excessively high energy consumption, poor silicon recovery and unwanted fume evolution. In addition, the reduction of silicon dioxide by carbon involves an intermediate reaction whereby silicon dioxide is reduced to gaseous silicon monoxide whose disproportionation in the cooler region of the reactor is believed to result in cementation of the charge material caused by the deposition of viscous silicon dioxide. This results in stoking and mix feeding difficulties in the furnace which effects the overall production output of the desired iron-silicon alloy. To minimize these difficulties, large amounts of a suitable bulking agent, such as wood chips, have been added to the furnace charge.

One object of this invention is to provide a homogeneous agglomerated ferrosilicon charge for use in an electric-arc furnace for the production of iron-silicon alloys. The charge will result in a lower energy consumption and electrode usage rate per net ton of alloy produced while simultaneously providing a higher silicon recovery partially due to lower fume losses, elimination of large amounts of wood chips or the like, and improved furnace operation.

SUMMARY OF THE INVENTION

Broadly stated, this invention is directed to the production of iron-silicon alloys by the submerged-arc technique using a furnace charge which is believed to result in a more efficient utilization of gaseous silicon monoxide generated within a furnace during the production of the alloy and in a homogeneous dissemination of a particulated iron-bearing material throughout the reaction zone of the furnace.

The charge is prepared by blending a particulated iron-bearing material, such as iron oxide, a fine fraction and a course fraction of silica, a particulated carbon reductant and a bulking agent in a proper proportion to yield an iron-silicon alloy containing from between about 45% and about 95% by weight silicon upon effecting reduction of all reducible additives. The mixture can then be agglomerated by any suitable technique, such as extrusion, using a binder material which can be added in an amount equal to or less than ten percent by weight of the charge. The size of the agglomerate is variable and depends somewhat on the size of the furnace being used. Preferably, one dimension of the charge, i.e., length, width, diameter, thickness, etc., should be about ½ inch or smaller to ensure substantial reaction of its carbon content as soon as possible within the reactor.

A process in accordance with the present invention for producing ferrosilicon comprises the charging of the aforesaid agglomerate to an electric furnace, heating the electric furnace by means of at least one electrode submerged in the charge of agglomerates to cause reaction between the materials therein to form ferrosilicon alloy, and then tapping the ferrosilicon alloy from the furnace.

The novelty of the process of this invention is in the use of agglomerates comprising two forms of silica, a fine fraction and a coarse fraction, admixed with a particulated iron-bearing material plus a particulated carbon reductant. The bulk of the fine fraction of silica is believed to react with the carbonaceous reducing agent to form silica carbide and carbon monoxide while the bulk of the coarse fraction is believed to react with the silicon carbide so formed to produce silicon monoxide which in turn further reacts with silicon carbide to release silicon for reaction with the iron-bearing material. The sizing of the silica into two discrete fractions enables the reactive agents of the silicon reaction to be present within the reaction zone of the furnace in a form suitable for efficiently producing silicon as described in our copending application Ser. No. 878,229 now issued as U.S. Pat. 3,660,298. The increase in the yield of silicon due to the agglomerate charge prepared according to this invention is partially attributed to the effective reduction of the large recirculating load of gaseous silicon monoxide resulting from a more efficient utilization of the silicon monoxide in its reaction with silicon carbide to form silicon.

The particulated iron-bearing material proportionally disposed in each agglomerate provides a means of homogeneously disseminating the iron within the reaction zone of the furnace. This contributes to an environment ideally suited for the reaction of the iron with the silicon thereby producing an iron-silicon alloy at a reduced energy consumption rate and electrode usage rate per pound of alloy.

The amount of iron-bearing material in the agglomerate charge is variable and depends on the percentage of silicon desired in the iron-silicon alloy to be produced. This silicon can vary between about 45% to 95% by weight of the alloy. The iron-bearing material should be pulverized and intimately mixed with the other mix additives so that when charged into the furnace the iron will be homogeneously disseminated therein. The exact size of the iron-bearing material is somewhat arbitrary but should be preferably about 100 Tyler mesh size and finer.

The fixed carbon content in the charge is also a variable and likewise depends on the desired ferrosilicon alloy required. For example, the fixed carbon content of a charge can vary between a minimum of about 85% of the stoichiometric amount necessary for reduction of all the silica according to the reaction $$SiO_2 + 2C \rightarrow Si + 2CO$$

for the production of 95% ferrosilicon and a maximum of about 120% of the stoichiometric amount necessary for the reduction of all the silica according to the same reaction for the production of 45% ferrosilicon. The size of the carbon reductant is somewhat arbitrary but should be of a sufficiently fine size to allow for intimate mixing with the fines of the silica. A size of about 100 Tyler mesh or finer is recommended. Coal, coke and the like are suitable carbonaceous reducing agents.

The size of the coarse fraction of particulated silica can vary between about 1/16" and about 1/2" while its fine fraction should be about 48 Tyler mesh size or finer, preferably about 100 Tyler mesh size. The ratio of fine fractions to coarse fractions can vary between about 1/2 and about 2.

The choice of a low-density bulking agent is arbitrary and can depend on such factors as availability, cost, chemical purity, ease of use and carbon content. One important requirement is that the bulking agent be of a low density so that upon being admixed with the other charge additives, the overall charge will have a bulk density of 60 lb./cu. ft. or less, preferably 50 lb./cu. ft. or less.

The blending together of these reactive additives, in suitable proportions, will produce low-density, homogeneous, agglomerated charges which upon being fed to an electric furnace will produce a ferrosilicon alloy by submerged-arc techniques at a greatly reduced energy expense per pound of alloy. In addition, a saving can be realized from a reduction in the electrode usage rate and from a reduction in the amounts of bulking agents usually required by the commercial techniques presently being employed for producing ferrosilicon.

EXAMPLE I

An agglomerated furnace charge was prepared by blending together the following materials:

(1) 58.0 parts by weight of Tilden iron ore (containing 37.31% Fe and 44.40% $SiO_2$) ground to substantially 100 Tyler mesh size and finer, (2) 84.0 parts by weight of a fine fraction of silica ground to substantially 200 Tyler mesh size and finer, (3) 84.0 parts by weight of a coarse fraction of silicon about 1/4 inch by 1/8 inch, (4) 93.0 parts by weight of East Gulf coal (containing 79.7% fixed carbon, 15.0% volatiles, 4.5% ash) ground to substantially 200 Tyler mesh size and finer, (5) 15.0 parts by weight of dry straw about 1 inch size, (6) 87.0 parts by weight of a binder solution comprised of 6% lignin solids and 94% water.

These materials provided a carbon content of 98.0% of theoretical carbon required for reduction according to the following reaction $SiO_2 + 2C \rightarrow Si + 2CO$.

The above materials were preblended and fed to a 6-inch diameter, auger-type extruder to produce 5/8-inch square extrusions of varying lengths up to 6 inches. After drying to about 5% moisture content, the agglomerate charge was found to have a bulk density of between 35 and 40 lb./cu. ft.

The agglomerate charge was then fed to a 40-kw., single phase electric furnace comprised of a properly insulated 10-inch diameter by 10-inch deep graphite crucible. The power for the furnace was delivered through vertically disposed, two 1½-inch diameter graphite electrodes which were embedded in the charge so as to provide a submerged-arc reaction zone.

The additives in the charge then underwent reduction in the submerged-arc electric furnace and produced an iron-silicon alloy containing about 75% silicon. The power consumed per pound of silicon, the electrode consumption per net ton of alloy produced and the percent of silicon recovered from this charge is shown in Table II under Mix G.

For comparison sake, 75% ferrosilicon was produced using the identical furnace and process as stated above except that a conventional loose mix and a variety of prepared agglomerated mixes were substituted for the agglomerate charge prepared according to this invention. Table I shows the compositional make-up of these mixes which are lettered A through F.

Mix A represents a conventional loose mix charge.

Mix B is similar to the charge prepared according to the invention except that only one size silica was used.

Mix C contained no bulking agent or coarse silica and was made by pelletizing rather than extruding. This produced pellets smaller in size and denser than the extrusions in Mix G.

Mix D was prepared according to the invention using sawdust as a bulking agent.

Mix E was prepared according to the invention using crushed corncobs as the bulking agent.

Mix F was prepared with coarse silica fractions which were fed to the furnace separately from the agglomerated charge but at the same time.

Mix G was prepared as described above.

Table II shows the electrical energy consumption per pound of silicon, the percent of silicon recovered, and the electrode consumption rate per net ton of 75% ferrosilicon alloy produced, for each of the mixes A through G. This data represents averages for all furnace taps made following an initial startup period for each mix. As can be seen from the results listed in Table II, the charges prepared in accordance with this invention maximized the recovery of silicon while minimizing both the energy required for and the electrode consumption expended per net ton of alloy produced. Another important benefit achieved by the charges prepared according to this invention was that it resulted in a better over-all furnace operation.

TABLE I.—FURNACE CHANGES FOR 75% FERROSILICON

| Mix | Silica Wt. percent | Silica Size number | Wt. percent | Size number | Iron scrap Wt. percent | Iron scrap Size number | Tilden iron ore [1] Wt. percent | Tilden iron ore Size number | East Gulf coal [2] Wt. percent | East Gulf coal Size number | Bulking agent Wt. percent | Bulking agent Type | Agglomerating method |
|---|---|---|---|---|---|---|---|---|---|---|---|---|---|
| A | 46.7 | ½" x ¼" | | | 5.9 | +20 M | | | 18.0 | ½" x ¼" | 29.4 | Wood chips | None. |
| B | 49.8 | 200 MxD | | | | | 16.0 | 100 MxD | 28.6 | 200 MxD | 5.6 | Straw | Extrusion. |
| C | 52.4 | 200 MxD | | | | | 18.2 | 100 MxD | 29.4 | 200 MxD | | None | Pelletizing. |
| D | 25.1 | 200 MxD | 25.2 | ¼" x ⅛" | | | 17.4 | 100 MxD | 27.5 | 200 MxD | 4.8 | Sawdust | Extrusion. |
| E | 25.2 | 200 MxD | 25.2 | ¼" x ⅛" | | | 17.1 | 100 MxD | 27.9 | 200 MxD | 4.5 | Corncobs | Do. |
| F | 51.3 | ¼" x ⅛" | | | | | 15.5 | 100 MxD | 27.7 | 200 MxD | 5.5 | Straw | Do. |
| G | | | | | | | Prepared as shown in the example | | | | | | |

[1] Tilden iron ore contains 44.4% $SiO_2$ and 37.3% Fe.
[2] East Gulf coal contains 79.7% fixed carbon, 15.0% volatiles, 4.5% ash.

NOTE.—M represents Tyler Mesh Size and MxD represents Tyler Mesh Size and Finer.

TABLE II.—75% FERROSILICON PRODUCTION FOR CHANGES SHOWN IN TABLE I

| Mix | Voltage | Amperage | Kw. | Kwh./lb. Si | electrode/ Kwh. | Percent Si recovered | Lb. |
|---|---|---|---|---|---|---|---|
| A | 61 | 644 | 40.5 | 171 | 10.5 | 77.6 | 210 |
| B | 66 | 599 | 41.3 | 240 | 8.37 | 77.4 | 103 |
| C | 71 | 630 | 45.4 | 180 | 7.03 | 74.8 | 115 |
| D | 73 | 604 | 45.7 | 180 | 7.29 | 86.7 | 123 |
| E | 74 | 614 | 45.2 | 180 | 7.78 | 84.6 | 112 |
| F | 55 | 772 | 43.7 | 240 | 10.57 | 61.6 | 128 |
| G | 67 | 667 | 46.5 | 240 | 6.63 | 82.9 | 65 |

What is claimed is:

1. A process for the electric arc furnace production of ferrosilicon having between about 45% silicon and about 95% silicon by weight comprising:
   (a) forming homogeneous agglomerates from mixtures of a particulated carbonaceous reducing agent, a particulated iron-bearing material and a particulated silica wherein said carbonaceous reducing agent comprises between about 85% and about 120% of the amount stiochiometrically required for the reduction of silica according to the reaction:

$$SiO_2 + 2C \rightarrow Si + 2CO$$

and wherein the particulated silica comprises a fine fraction and a coarse fraction, said fine fraction sized about 48 mesh and finer, said coarse fraction sized between about $\frac{1}{16}$ inch and about $\frac{1}{2}$ inch, and the weight ratio of the fine fraction to the coarse fraction being between about $\frac{1}{2}$ and about 2;
   (b) charging the agglomerates into an electric furnace;
   (c) heating the agglomerates in the electric furnace by means of at least one electrode submerged in the agglomerate charge to cause reduction of the reducible additives in said agglomerate charge to yield a molten ferrosilicon alloy having between about 45% and about 95% by weight silicon; and
   (d) subsequently tapping said molten ferro-silicon alloy from the electric furnace.

2. The process of claim 1 wherein a low density bulking agent is added to the mixture in step (a) so as to form an agglomerated furnace charge having a maximum density of about 60 pounds per cubic foot.

3. The process of claim 2 wherein a binder exclusive of solvent is added to the agglomerated furnace charge in an amount up to about 10 percent of the furnace charge.

4. The process of claim 2 for the production of 75% ferrosilicon wherein the fixed carbon content of said particulated carbonaceous reducing agent comprises about 100 percent of the amount stoichiometrically required for the reduction of silica according to the reaction $$SiO_2 + 2C \rightarrow Si + 2CO$$

5. A furnace charge for the production of between about 45% and about 95% ferrosilicon in an electric furnace, said charge comprising an agglomerated homogeneous mixture of a particulated carbonaceous reducing agent, a particulated iron-bearing material and a particulated silica wherein the carbon contents of said carbonaceous reducing agent comprises between about 85% and about 120% of the amount stoichiometrically required for the reduction of silica to produce silicon metal and carbon monoxide according to the reaction $$SiO_2 + 2C \rightarrow Si + 2CO$$

and wherein said particulated silica comprises a fine fraction and a coarse fraction, said fine fraction sized about 48 mesh and finer, said coarse fraction sized between about $\frac{1}{16}$ inch and about $\frac{1}{2}$ inch, and the weight ratio of the fine fraction to the coarse fraction being between about $\frac{1}{2}$ and about 2.

6. The product of claim 5 wherein a low density bulking agent is added to the mixture and wherein said furnace charge has a maximum density of about 60 pounds per cubic foot.

7. The product of claim 6 wherein a binder exclusive of solvent is added to the agglomerated charge in an amount up to about 10 percent of the furnace charge.

8. The product of claim 6 for use in the production of 75% ferrosilicon wherein the carbon contents of said carbonaceous reducing agent is about 100 percent of the amount required for the reduction of silica according to the reaction:

$$SiO_2 + 2C \rightarrow Si + 2CO$$

References Cited

UNITED STATES PATENTS

| | | | |
|---|---|---|---|
| 2,651,569 | 9/1953 | Loewen et al. | 75—10 R |
| 2,907,651 | 10/1959 | Black | 75—10 R |
| 3,215,522 | 11/1965 | Kuhlmann | 75—10 R |
| 1,863,507 | 6/1932 | Southgate | 75—3 |
| 2,896,263 | 7/1959 | Frederick et al. | 75—3 X |

ALLEN B. CURTIS, Primary Examiner

U.S. Cl. X.R.

23—204; 75—10 R